Figure 1:
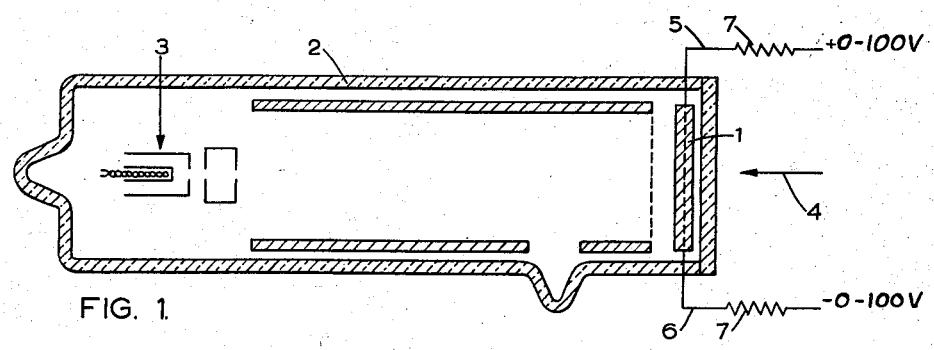

July 15, 1958   J. WARDLEY   2,843,773
PICK-UP TUBE TARGETS
Filed Aug. 13, 1956

Inventor
J. Wardley
By Larson Downing Teebold
Attys.

United States Patent Office 2,843,773
Patented July 15, 1958

2,843,773

PICK-UP TUBE TARGETS

John Wardley, Hounslow, England, assignor to Electric & Musical Industries Limited, Hayes, Middlesex, England, a company of Great Britain Application August 13, 1956, Serial No. 603,771

Claims priority, application Great Britain August 17, 1955

2 Claims. (Cl. 313—65)

This invention relates to pick-up tubes using photo-conductive materials.

It has been proposed to employ as the target in a pick-up tube, such as used in television cameras, a transparent electrode on which is deposited a thin layer of a photo-conductive material. Such a target has some disadvantages, in particular it is necessary to make a compromise between the sensitivity and the resistivity of the said photo-conductive material.

The object of the invention is to provide an improved pick-up tube target having increased sensitivity.

According to the present invention there is provided a pick-up tube target comprising a plurality of spaced apart conductive signal elements disposed between two resistive layers so that alternate signal elements are in electrical contact with a first of said layers and are insulated from the second layer and the intervening signal elements are in electrical contact with the second layer and insulated from the first layer, said layers being in electrical contact with each other between said elements and said first layer comprising a material providing a resistance variable with the intensity of light incident thereupon and the second layer comprising a material capable of providing a substantially fixed resistance when the target is incorporated in a pick-up tube.

The material for providing the fixed resistance is preferably a semi-conductive material which is not also photo-conductive, but a photo-conductive material may be used provided it is screened from light when the target is incorporated in the pick-up tube. The material providing the variable resistance is a suitable photo-conductive material. Since the electrical path from each signal element to an adjacent signal element traverses an element of the first layer and then an element of the other layer the target may be regarded as composed of a multiplicity of elementary bridge circuits. Each bridge circuit comprises a resistance due to one layer and a resistance due to the other layer connected in series between the respective signal elements, the corresponding capacities of the respective layer elements being in parallel with the resistances. When the target is embodied in a pick-up tube the ends of the elementary bridge circuits may be connected to equal and opposite voltage supplies by connecting alternate signal elements to one of said supplies and the intervening signal elements to the other of said supplies. The resistivities of the materials of the two layers are selected so that each elementary bridge circuit is balanced in the dark, with a potential at the junction between the two layer elements, where they are electrically connected, at a suitable datum level which may be the potential of the gun cathode of the pick-up tube. When the photo-conductive material is illuminated by a light image the resistance of the elements thereof decrease in dependence upon the intensities of elementary points of the incident light image and the junction points of the elementary bridge circuits assume different potentials allowing scanning beam current to land, thereby producing a signal output from the tube representative of the light image.

The present invention facilitates the production of targets of relatively low resistivity and relatively high sensitivity. One of the layers of resistive material of the target, in particular that which is required to have a fixed resistance in operation, can be self-supporting, being for example made of glass and the other layer, namely the photo-conductive layer, may be deposited by evaporation in vacuum in the pick-up tube after degassing operations have been completed. All the signal elements and the insulation therefor are of course deposited on the self-supporting layer before evaporation of the photo-conductive layer.

Figure 2:
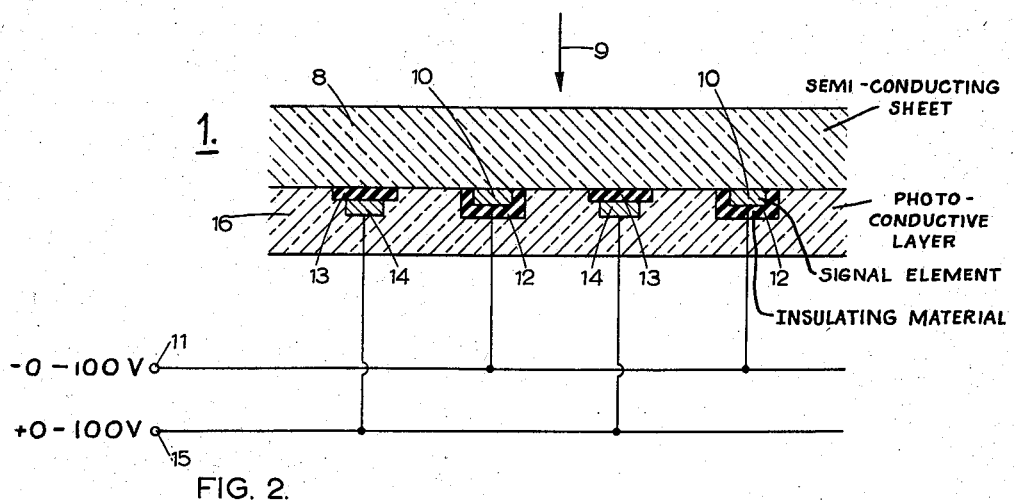

In order that the present invention may be clearly understood and readily carried into effect, the same will now be more fully described with reference to the accompanying drawings, in which:

Figure 1 shows a pick-up tube comprising a target in accordance with the present invention, and Figure 2 is a diagrammatic representation of a pick-up tube target in accordance with one embodiment of the invention.

By way of example a pick-up tube of the vidicon type is shown in Figure 1. The tube is conventional in design with the exception of the target 1 the construction of which will be described hereinafter. The tube comprises a glass envelope 2 enclosing an electron gun 3 disposed in one end thereof. At the other end of the envelope the target 1 is provided, and during operation of the tube may be illuminated by light from an optical image in the direction given by the arrow 4. The target is scanned by an electron beam produced by the gun 3. Polarity leads 5 and 6, to which may be applied equal and opposite voltages $+v$ and $-v$ respectively, are connected to signal elements of the target and the resulting signal may be derived via load resistors 7 in one or both of said leads.

Referring to Figure 2, the target 1 of the tube shown in Figure 1 comprises a self-supporting sheet of semi-conducting material 8, having on its side away from the electron gun, the beam from which is denoted by the arrow 9, a plurality of spaced apart signal elements 10 in the form of parallel strips which are connected to a common terminal 11 to which the negative voltage $-v$ may be applied. The semi-conducting material must be of suitable resistivity and thickness in order that its resistance may balance the dark resistance of the photo-conductor in the bridge circuit, for which purpose a stretched blown glass film may, for example, be used. The signal elements 10 are completely covered on all faces except that in contact with the semi-conducting sheet 8, with an insulating material 12 which may be evaporated onto the required surface through a suitable stencil. Between said signal elements 10 are deposited, parallel to the signal elements 10, strips of insulating material 13 on the surface of the said semi-conducting sheet 8 in such a manner that the elements of insulating material 12 and 13 are spaced apart, to leave exposed some area of the semi-conducting sheet 8. On the strips of insulating material 13 is a second set of signal elements 14 which are connected to a second common terminal 15 to which may be applied the positive voltage $+v$. The assembly of signal elements 10 and 14, and insulating strips 12 and 13, together with the exposed area of the semi-conducting sheet are then completely covered by a layer of a photo-conductive material 16. The photo-conductive material can be a highly sensitive material, for example cadmium sulphide or selenium whose dark resistance may be as low as $10^5$ ohm-centimeters.

The photo-conductive material 16 thus acts as the variable resistances and the semi-conducting material 8 as the fixed resistances of a multiplicity of elementary potentiometer bridge circuits. The voltage V can be any convenient voltage, usually within the range 0 to 100 volts depending upon the resistance of the layers 8 and 16. Balance of each bridge circuit is arranged to occur at the dark resistance of the photo-conductor 16 as previously stated, and the scanning current flows whenever said photo-conductor is illuminated due to the change of potential of the junction between the photo-conductive and the semi-conducting materials. When the target is illuminated the potential at the junction of the layers 8 and 16 changes, and some of the charge leaks across the semi-conducting layer 8 by capacitance, and is scanned by the electron beam.

The present invention enables the photo-conductive material to be deposited as a continuous film in the final stage of manufacture of the target, which stage may take place after said target is supported in the pick-up tube and all degassing bakes have taken place.

The present invention may be employed as targets in pick-up tubes in colour television cameras in addition to monochrome cameras.

What I claim is:

1. A pick-up tube target comprising a plurality of spaced apart conductive signal elements disposed between two resistive layers so that alternate signal elements are in electrical contact with a first of said layers and are insulated from the second layer, and the intervening signal elements are in electrical contact with the second layer and insulated from the first layer, said layers being in electrical contact with each other between said elements, and said first layer comprising a material providing a resistance variable with the intensity of light incident thereupon, and the second layer comprising a material capable of providing a substantially fixed resistance when the target is incorporated in a pick-up tube.

2. A target according to claim 1, wherein said second layer comprises a self-supporting layer of semi-conductive material.

References Cited in the file of this patent
UNITED STATES PATENTS

| | | |
|---|---|---|
| 2,719,241 | Coltman | Sept. 27, 1955 |
| 2,728,021 | Blanks | Dec. 20, 1955 |
| 2,749,471 | Rittner | June 5, 1956 |
| 2,768,310 | Kazan et al. | Oct. 23, 1956 |
| 2,770,746 | Gray | Nov. 13, 1956 |